US010122864B2

(12) United States Patent
Li et al.

(10) Patent No.: US 10,122,864 B2
(45) Date of Patent: Nov. 6, 2018

(54) CORRESPONDENCES ESTABLISHMENT BETWEEN MOBILE USER AND NETWORK ACCOUNTS

(71) Applicant: INTERNATIONAL BUSINESS MACHINES CORPORATION, Armonk, NY (US)

(72) Inventors: Li Li, Beijing (CN); Chun Hua Tian, Beijing (CN); Feng Juan Wang, Beijing (CN); Yu Wang, Beijing (CN); Ji Zheng Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/867,537

(22) Filed: Sep. 28, 2015

(65) Prior Publication Data
US 2016/0094980 A1 Mar. 31, 2016

(30) Foreign Application Priority Data
Sep. 29, 2014 (CN) .......................... 2014 1 0513926

(51) Int. Cl.
*H04W 4/16* (2009.01)
*H04W 8/18* (2009.01)
(Continued)

(52) U.S. Cl.
CPC ......... *H04M 15/41* (2013.01); *H04M 3/2218* (2013.01); *H04W 4/16* (2013.01);
(Continued)

(58) Field of Classification Search
CPC ........... H04L 29/12594; H04L 61/3085; H04L 29/06585; H04L 63/08; H04L 63/166; H04L 67/02; H04L 67/102; H04W 8/18
(Continued)

(56) References Cited

U.S. PATENT DOCUMENTS 7,769,820 B1 *  8/2010  Spies ...................... H04L 63/08
                                                      709/218
8,108,517 B2    1/2012  Kalavade
                        (Continued)

FOREIGN PATENT DOCUMENTS

CN        103838834       6/2014

OTHER PUBLICATIONS

Dmitry Namiot et al., "On Database for Mobile Phones Ownership", Proceeding of the 15th Conference of Fruct Association, 2014.
(Continued)

*Primary Examiner* — Julio Perez
(74) *Attorney, Agent, or Firm* — F. Chau & Associates, LLC (57) ABSTRACT

A method for establishing correspondences between mobile communication users and their network accounts includes acquiring an identifier of one of the mobile communication users and access information corresponding to the identifier from a communication stream. The access information includes Uniform Resource Locators (URLs) associated with network resources that have been accessed by the one of the mobile communication users. The method further includes acquiring a first set of network accounts associated with the URLs, and determining a second set of network accounts corresponding to the one of the mobile communication users based on the first set of network accounts.

14 Claims, 4 Drawing Sheets

(51) Int. Cl.
*H04M 15/00* (2006.01)
*H04M 3/22* (2006.01)
*H04L 29/08* (2006.01)
*H04L 29/12* (2006.01)

(52) U.S. Cl.
CPC ...... *H04L 61/2053* (2013.01); *H04L 61/6054* (2013.01); *H04L 67/22* (2013.01)

(58) Field of Classification Search
USPC .................................. 455/464, 466, 456.3
See application file for complete search history.

(56) References Cited

U.S. PATENT DOCUMENTS

| | | | |
|---|---|---|---|
| 8,284,786 | B2 | 10/2012 | Mirandette et al. |
| 8,898,297 | B1* | 11/2014 | Taylor ............... G06F 17/30867 707/706 |
| 9,172,699 | B1* | 10/2015 | Vazquez ............. H04L 63/0861 |
| 9,264,412 | B1* | 2/2016 | Chao ........................ H04L 63/08 |
| 2003/0081000 | A1* | 5/2003 | Watanabe ............. G06F 17/241 715/751 |
| 2003/0200442 | A1* | 10/2003 | Bhat ....................... H04L 67/02 713/182 |
| 2011/0093589 | A1* | 4/2011 | Dale ................... G06F 11/3414 709/224 |
| 2011/0196935 | A1* | 8/2011 | Rideout .................. H04W 4/21 709/206 |
| 2011/0201351 | A1 | 8/2011 | Chen |
| 2013/0060848 | A1 | 3/2013 | Davis et al. |
| 2013/0117816 | A1* | 5/2013 | Dittrich ............... H04L 63/0807 726/4 |
| 2013/0195457 | A1 | 8/2013 | Levy et al. |
| 2013/0311283 | A1 | 11/2013 | Liu et al. |
| 2014/0189861 | A1* | 7/2014 | Gupta ..................... H04L 63/08 726/22 |
| 2016/0072961 | A1* | 3/2016 | Formo .................. H04W 24/10 455/406 |

OTHER PUBLICATIONS

Chinese First Office Action dated Jun. 22, 2018 corresponding to Chinese Application No. 201410513926.0.

\* cited by examiner

CORRESPONDENCES ESTABLISHMENT BETWEEN MOBILE USER AND NETWORK ACCOUNTS

CROSS-REFERENCE TO RELATED APPLICATIONS

This application claims priority to and the benefit of Chinese Patent Application No. 201410513926.0 filed in the Chinese Patent Office on Sep. 29, 2014, the disclosure of which is incorporated by reference herein.

BACKGROUND

Exemplary embodiments of the present invention relate to the field of mobile communication, and more particularly, to a method and apparatus for establishing correspondences between a mobile communication user and his/her network accounts.

There are more and more mobile communication users who utilize their mobile communication terminals, such as smartphones, to access network resources, for example, to log into various websites or applications. As the websites and applications accessed and network accounts used increases, users are likely to confuse or even forget their network accounts used for some websites or applications. Thus, users are always facing the difficulties and burdens regarding managing their network accounts. In addition, users that have lost their mobile communication devices may have difficulty recovering their network accounts.

Further, a single user may have a plurality of different mobile communication numbers (such as different mobile phone numbers), and the user may wish to share various network accounts for websites or applications that have been accessed via one communication number with another communication number so that such network accounts may be directly invoked by the another communication number.

Further, users may wish to share their network accounts for various website and applications with other users in a convenient manner.

SUMMARY

Exemplary embodiments of the present invention provide a way to effectively establish correspondences between a mobile communication user and his/her network accounts.

According to an exemplary embodiment of the present invention, a method for establishing correspondences between mobile communication users and their network accounts includes acquiring an identifier of one of the mobile communication users and access information corresponding to the identifier from a communication stream, wherein the access information includes Uniform Resource Locators (URLs) associated with network resources that have been accessed by the one of the mobile communication users. The method further includes acquiring a first set of network accounts associated with the URLs, and determining a second set of network accounts corresponding to the one of the mobile communication users based on the first set of network accounts.

According to an exemplary embodiment of the present invention, an apparatus for establishing correspondences between mobile communication users and their network accounts includes a memory storing a computer program, and a processor configured to execute the computer program. The computer program is configured to acquire an identifier of one of the mobile communication users and access information corresponding to the identifier from a communication stream, wherein the access information includes Uniform Resource Locators (URLs) associated with network resources that have been accessed by the one of the mobile communication users. The computer program is further configured to acquire a first set of network accounts associated with the URLs, and determine a second set of network accounts corresponding to the one of the mobile communication users based on the first set of network accounts.

Based on the acquisition and analysis of communication data, the exemplary embodiments described herein may effectively establish correspondences between a mobile communication user and his/her network accounts, enabling the user to manage and share his/her network accounts conveniently.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Exemplary embodiments of the present invention will be described in more detail with reference to the accompanying drawings. Like reference numerals may refer to like elements throughout the accompanying drawings. Exemplary embodiments of the present invention can be implemented in various manners, and thus should not be construed to be limited to the exemplary embodiments disclosed herein.

Figure 1:
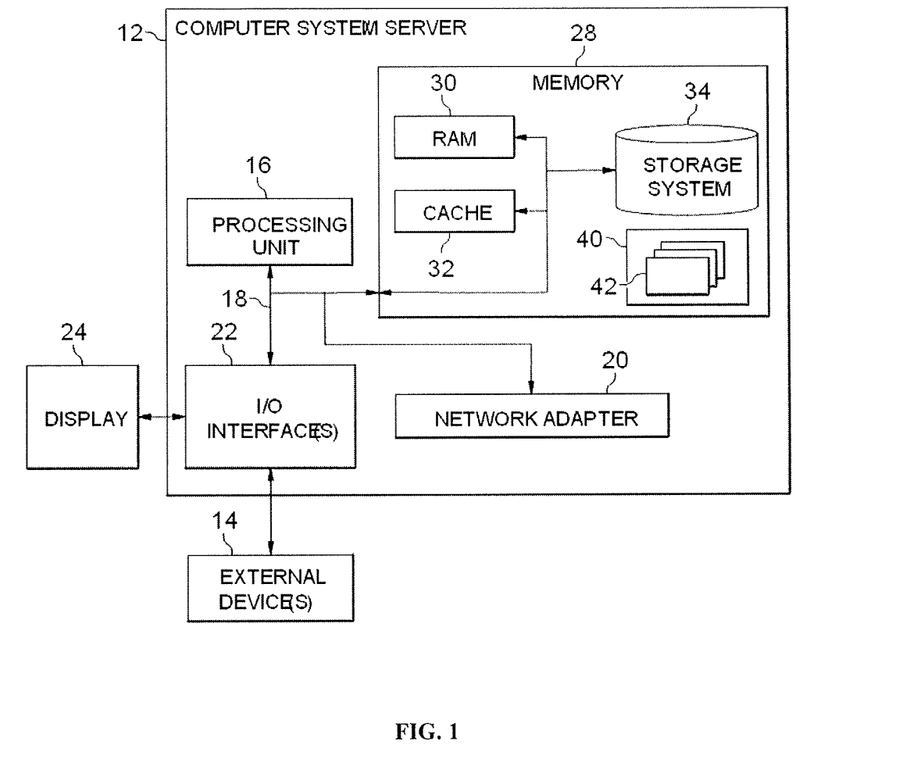
FIG. 1 shows an exemplary computer system/server that may implement exemplary embodiments of the present invention.

FIG. 1 shows an exemplary computer system/server 12 that may implement exemplary embodiments of the present invention. It is to be understood that the computer system/server 12 is only illustrative and is not intended to suggest any limitation as to the scope of use or functionality of exemplary embodiments of the invention described herein.

As shown in FIG. 1, the computer system/server 12 is shown in the form of a general-purpose computing device. The components of the computer system/server 12 may include, but are not limited to, one or more processors or processing units 16, a system memory 28, and a bus 18 that couples various system components including the system memory 28 to a processor 16.

The bus 18 represents one or more of any of several types of bus structures, including, but not limited to, a memory bus or memory controller, a peripheral bus, an accelerated graphics port, and a processor or local bus using any of a variety of bus architectures. Such architectures may include, but are not limited to, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and may include, for example, both volatile and non-volatile media and both removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (e.g., a hard drive). A magnetic disk drive for reading from and writing to a removable, non-volatile magnetic disk (e.g., a floppy disk), and an optical disk drive for reading from or writing to a removable, non-volatile optical disk such as, for example, a CD-ROM, DVD-ROM or other optical media, can be provided. In such instances, each can be connected to bus 18 by one or more data media interfaces. As will be further depicted and described below, memory 28 may include, for example, at least one program product having a set (e.g., at least one) of program modules that are configured to carry out the functions of the exemplary embodiments of the invention.

According to exemplary embodiments, a program/utility 40, having a set (at least one) of program modules 42, an operating system, one or more application programs, other program modules, program data, etc., may be stored in the memory 28. Each of the operating system, one or more application programs, other program modules, and program data, or some combination thereof, may include an implementation of a networking environment. Program modules 42 generally carry out the functions and/or methodologies of exemplary embodiments of the invention as described herein.

The computer system/server 12 may also communicate with one or more external devices 14 such as, for example, a keyboard, a pointing device, a display 24, etc., one or more devices that enable a user to interact with the computer system/server 12, and/or any devices (e.g., a network card, a modem, etc.) that enable the computer system/server 12 to communicate with one or more other computing devices. Such communication can occur via input/output (I/O) interfaces 22. The computer system/server 12 may communicate with one or more networks such as, for example, a local area network (LAN), a general wide area network (WAN), and/or a public network (e.g., the Internet) via a network adapter 20. As shown in FIG. 1, the network adapter 20 communicates with the other components of the computer system/server 12 via the bus 18. According to exemplary embodiments, other hardware and/or software components not shown in FIG. 1 may be used in conjunction with the computer system/server 12. Examples include, but are not limited to, microcode, device drivers, redundant processing units, external disk drive arrays, RAID systems, tape drives, data archival storage systems, etc.

Figure 2:
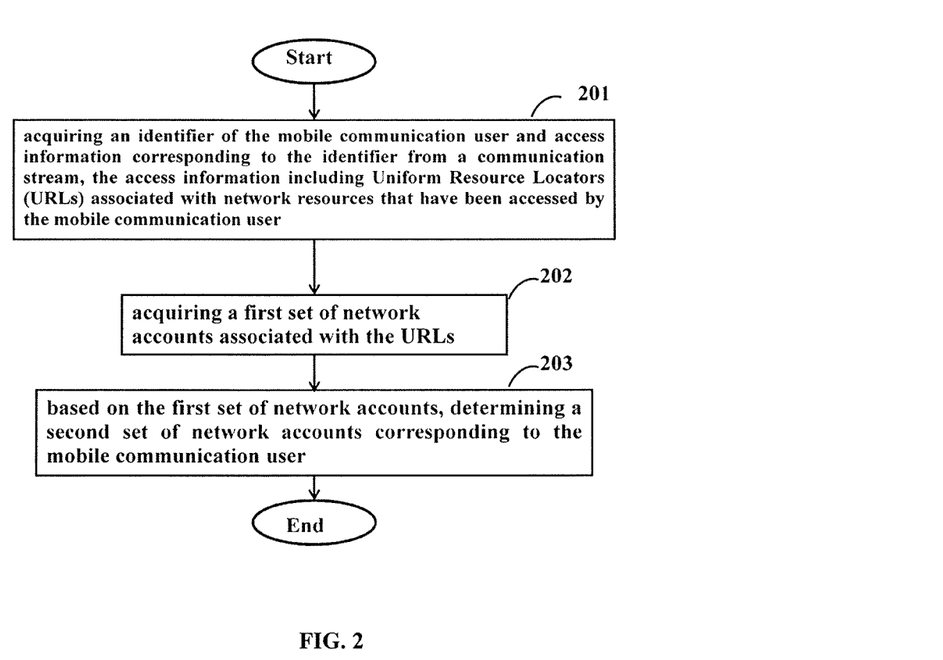
FIG. 2 shows a flowchart of a method for establishing correspondences between mobile communication users and their network accounts according to an exemplary embodiment of the present invention.

FIG. 2 shows a flowchart of a method for establishing correspondences between mobile communication users and their network accounts according to an exemplary embodiment of the present invention Referring to FIG. 2, according to an exemplary embodiment of the present invention, a method for establishing correspondences between mobile communication users and their network accounts includes acquiring an identifier of the mobile communication user and access information corresponding to the identifier from a communication stream (201). The access information includes Uniform Resource Locators (URLs) associated with network resources that have been accessed by the mobile communication user. The method further includes acquiring a first set of network accounts associated with the URLs (202), and determining a second set of network accounts corresponding to the mobile communication user based on the first set of network accounts (203).

In an exemplary embodiment, the correspondences between a mobile communication user (e.g., an identifier of the mobile communication user) and his/her network accounts can be established with the URLs as a bridge. In this exemplary embodiment, when a mobile communication user accesses a network resource using his/her network account, the network account (e.g., a network user name) may occur in network accounts associated with the URLs related to the accessed network resource. Thus, based on a first set of network accounts associated with URLs, a second set of network accounts corresponding to the user may be determined. Each network account in the second set may be considered as a network account used for various network resources by the user.

For example, in a scenario of passing network accounts in a "get" manner, the network accounts may be directly encoded in original URLs directly corresponding to network resources. Then, when using the network accounts encoded in the original URLs accessed by the user as the first set of network accounts, this first set of network accounts may be taken as the second set of network accounts corresponding to the user.

Further, in a scenario of passing network accounts in such a manner that the network accounts are not directly encoded in original URLs (e.g., in a "post" manner), the network accounts are not directly obtained from the original URLs. However, when a user is in a logged-in state on a network resource, the network account corresponding to the user may be determined based on network accounts occurring on pages corresponding to the original URL and its associated URLs (e.g., URLs linked to the original URL directly or indirectly) that are accessed by the user. Thus, a second set of network accounts corresponding to the user can be determined on the basis of a first set of network accounts that is composed of network accounts occurring on pages corresponding to the original URL and its associated URLs that are accessed by the user.

This exemplary embodiment may be realized based on the acquisition and analysis of communication data, whereby correspondences between an identifier of the mobile communication user and various network accounts associated with the mobile communication user may be fully obtained. Once these correspondences have been established, using the identifier as an index, the user may conveniently find network accounts that he/she used on various network resources, and may conveniently manage and share such network accounts accordingly.

With regard to operation 201, in an exemplary embodiment, a technique such as Deep Packet Inspection (DPI) may be used to obtain, from communication data streams, an identifier of a mobile communication terminal, and access information corresponding to the identifier of the mobile communication terminal. The DPI technique is a stream detection and control technique based on the application layer, which may obtain complete data stream contents of an application and parse the data stream through deeply reading the contents of Internet Protocol (IP) packet payloads. With a Wideband Code Division Multiple Access (WCDMA) based communication system as an example, the DPI technique may be applied on a mobile network data interface, such as a GN interface, so that data streams passing through the interface may be acquired and parsed so as to obtain an identifier of the mobile communication user and access information corresponding to the mobile communication user's identifier.

In an exemplary embodiment, the mobile communication user's identifier may be, for example, a Temporary Mobile Subscriber Identity (TMSI) of the mobile communication user, or an International Mobile Subscriber Identity (IMSI). IMSI is effective information used to uniquely identify a mobile communication user. In practical communications, in order to ensure the security of IMSI, a TMSI may be assigned to a user temporarily. However, in situations in which TMSI is unrecognizable, IMSI may be used for communication. Correspondences between IMSI and TMSI may be maintained in Call Detailed Records (CDRs).

In an exemplary embodiment, for the identifier of each mobile communication user, its corresponding access information may include URLs associated with network resources that have been accessed by the mobile communication user. In addition, it may further include access times corresponding to the URLs. In an example, the URL may be an original URL directly corresponding to a network resource that has been accessed by the mobile communication user.

Table 1 shows an example of identifiers of mobile communication users and their corresponding access information obtained from communication data streams. As can be seen from Table 1, through operation 201, information regarding a certain original URL that has been accessed at a certain point of time by a certain identifier of a mobile communication user may be obtained.

TABLE 1

| Identifier | Original URL | Access time |
| --- | --- | --- |
| TMSI1 | URL1 | T1 |
| TMSI1 | URL1 | T2 |
| TMSI1 | URL2 | T3 |
| TMSI2 | URL1 | T3 |

It should be understood that, for the convenience of description, the amount of data shown in Table 1 and Tables 2 to 5 below is exemplary, and that according to exemplary embodiments, the amount of data obtained from communication data streams can be greater than the amount of data shown in Table 1 and Tables 2 to 5.

In an example, data obtained through DPI may be further analyzed using a stream computing tool, such as infoSphere Streams™. For example, data obtained through DPI may be filtered according to a specified original URL (in other examples, Table 1 may be filtered according to an identifier or other information), so as to obtain data corresponding to the specified original URL. The specified original URL may be, for example, a URL associated with a specific website or application. For example, Table 2 shown below may be obtained after filtering Table 1 with "URL1" as a keyword.

TABLE 2

| Identifier | Original URL | Access time |
| --- | --- | --- |
| TMSI1 | URL1 | T1 |
| TMSI1 | URL1 | T2 |
| TMSI2 | URL1 | T3 |

At operation 202, data shown in Table 1 or Table 2 may be further processed, for example, to obtain a first set of network accounts.

In an exemplary embodiment, in a case in which the original URLs themselves include network accounts, acquiring a first set of network accounts may include acquiring network accounts directly encoded in the original URLs as described above, so as to form the first set of network accounts. For example, with the first row of Table 1 as an example, network accounts used by mobile communication user TMSI1 for a network resource associated with URL1 may be directly obtained from URL1, and network accounts used by user TMSI1 for network resources associated with other original URLs may be obtained in a similar manner, so that a first set of network accounts can be formed with such network accounts obtained. In this example, the first set of network accounts may be directly used as the second set of network accounts, and thus correspondences between mobile communication user TMSI1 and his/her network accounts used for various network resources can be established.

Figure 3:
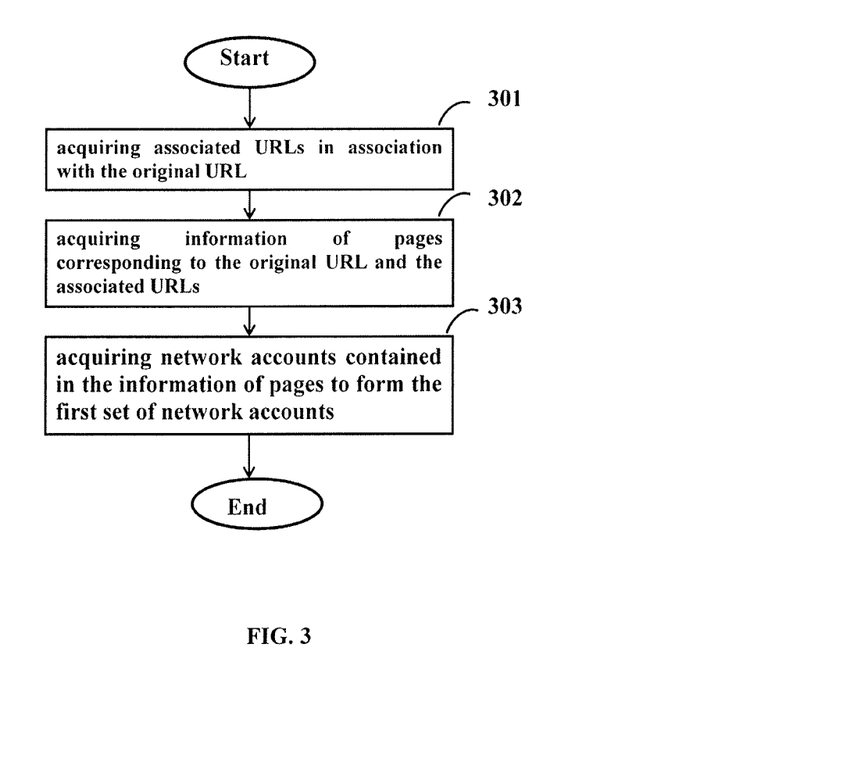
FIG. 3 shows a flowchart of an example of acquiring a first set of network accounts associated with URLs according to an exemplary embodiment of the present invention.

In an exemplary embodiment, in the case in which the original URLs have no network accounts contained themselves, acquiring a first set of network accounts may include acquiring network accounts occurring on pages corresponding to the original URLs and their associated URLs to form the first set of network accounts. FIG. 3 shows a flowchart of a possible way of acquiring the first set of network accounts, which includes acquiring associated URLs in association with the original URL (301), acquiring information of pages corresponding to the original URL and the associated URLs (302), and acquiring network accounts contained in the information of pages to form the first set of network accounts (303).

In an example, information of pages corresponding to an original URL accessed by a mobile communication user can be acquired using, for example, a crawler or other known techniques. This original URL can be used as a clue to obtain other URLs directly or indirectly linked to the original URL as associated URLs, and in turn to obtain the page contents corresponding to those associated URLs. Based on existing page content parsing tools, these page contents may be parsed to obtain network accounts from which the first set of network accounts can be formed. The first set of network accounts will include the second set of network accounts corresponding to the mobile communication user. It should be understood that those associated URLs are not limited to the URLs directly or indirectly linked to the original URL. For example, other URLs corresponding to the same network resource as the original URL or having access times closer to that of the original URL may also be taken as associated URLs.

In an exemplary embodiment, the range of the URLs associated with the original URL obtained at operation 301 may be narrowed, so as to improve the accuracy of established correspondences and increase calculation efficiency.

For example, in an example, in a case in which access information further includes an access time corresponding to the original URL (e.g., T1 corresponding to TMSI1 and URL1 in the first row of Table 1), only URLs associated with the original URL (URL1) and having access times closer to access time T1 are obtained as associated URLs. That is, only those associated URLs having access times closer to time T1 at which URL1 is accessed by the mobile communication user represented by TMSI1 are taken into consideration.

In an exemplary embodiment, only URLs associated with the original URL and corresponding to the same type of network resource as the original URL are treated as associated URLs. Referring to the first row of Table 1 as an example again, if URL1 corresponds to a website, only associated URLs corresponding to that website are considered, and no other associated URLs corresponding to other websites or applications are taken into account.

At operation 203, a second set of network accounts corresponding to the mobile communication user may be obtained based on the first set of network accounts using any suitable statistical analysis method.

In an exemplary embodiment, the second set of network accounts may be determined based on the frequency of each network account occurring in the first set of network accounts.

Figure 4:
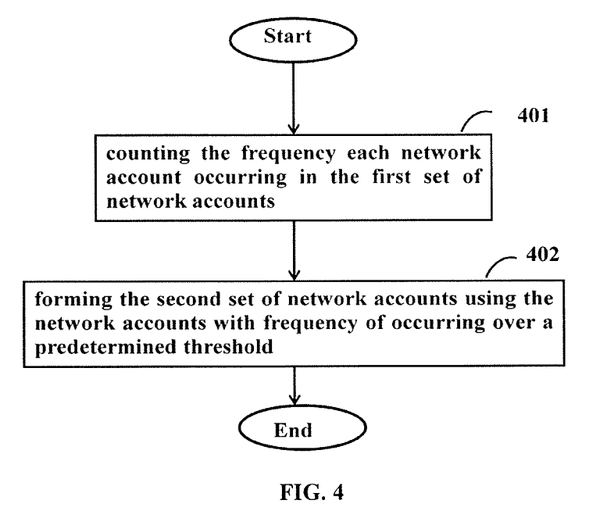
FIG. 4 shows a flowchart of a method illustrating an example in which a second set of network accounts corresponding to the mobile communication user is determined based on the frequency of each network account occurring in the first set of network accounts associated with the URLs according to an exemplary embodiment of the present invention.

FIG. 4 shows a flowchart of a method illustrating an example in which a second set of network accounts corresponding to the mobile communication user is determined based on the frequency of each network account occurring in the first set of network accounts. The method includes counting the frequency of each network account occurring in the first set of network accounts (401), and forming the second set of network accounts using the network accounts with the frequency occurring over a predetermined threshold.

Taking mobile communication user TMSI1 in Table 1 as an example, with accessed URL1 as a clue, a first set of network accounts comprised of network accounts USER1-USER4 associated with URL1, as well as the frequency of each of these network accounts occurring, can be obtained as shown in Table 3.

TABLE 3

| Identifier | Original URL | The first set of network accounts | Frequency of Occurring |
|---|---|---|---|
| TMSI1 | URL1 | USER1 | 1 |
|  |  | USER 2 | 25 |
|  |  | USER 3 | 3 |
|  |  | USER 4 | 40 |

According to this implementation, USER4 with the highest frequency of occurrence can be taken as the network account used by the user represented by TMSI1 on a network resource represented by URL1. Therefore, the following correspondence can be established: a mobile communication user represented by TMSI1 uses user name USER4 on a website or application corresponding to URL1. USER4 can be a member of the second set of network accounts.

Based on the same principle, network accounts used by the mobile communication user represented by TMSI1 on websites or applications corresponding to other URLs (e.g., URL2) may be obtained, which all together form a second set of network accounts corresponding to user TMSI1. Thus, network accounts used by the user TMSI1 on various different network resources can be obtained. In an example, each network account in the second set of network accounts may be associated with a corresponding network resource.

In Table 2, user TMSI1 has accessed URL1 at two different times T1 and T2. The example shown in FIG. 4 may make no distinction between different access times, and the example shown FIG. 4 can be considered as performing the counting for URL1 with respect to T1 and T2, respectively, and then merging the counting results for the different times together to form the total counting result shown in FIG. 3.

Figure 5:
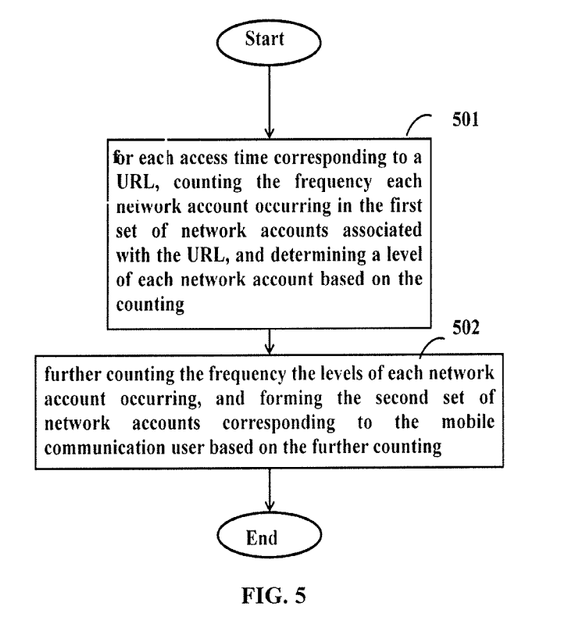
FIG. 5 shows a flowchart of a method illustrating an example in which a second set of network accounts corresponding to the mobile communication user is determined based on the frequency of each network account occurring in the first set of network accounts associated with the URLs according to an exemplary embodiment of the present invention.

In an exemplary embodiment, counting results may be produced with respect to various access times, respectively, and then a second set of network accounts corresponding to the mobile communication user can be determined from a further counting procedure performed on the previous counting results. FIG. 5 shows a flowchart illustrating an example in which, for each access time corresponding to a URL, counting the frequency of each network account occurring in the first set of network accounts associated with the URL, and determining a level of each network account based on the counting is performed at operation 501. Further counting the frequency of the levels of each network account occurring, and forming the second set of network accounts corresponding to the mobile communication user based on the further counting is performed at operation 502.

Table 4 and Table 5 schematically show an exemplary counting process shown in FIG. 5.

First, for two access times T1 and T2, counting of network accounts items USER1-USER4 in the first set of network accounts associated with URL1 are performed, respectively, and the counting results are rated according to any rules as needed. For example, the average of the total occurred frequency of all network accounts items at a point of time may be used as a first threshold value Th1. For example, for time T1, the first threshold value is (1+15+2+20)/4=9.5. Network accounts occurring less than the first threshold are rated as level 0. Furthermore, for network accounts occurring equal to or greater than the first threshold, a second threshold Th2 can be set. For example, the second threshold can be the sum of the first threshold Th1 and a first increment D1 (e.g., 9.5+3=12.5), and a third threshold may be set, for example, as the sum of the second threshold Th2 and a second increment D2 (e.g., 12.5+3=15.5). Thereby, network accounts occurring equal to or greater than the first threshold and less than the second threshold can be rated as level 1, network accounts occurring equal to or greater than the second threshold and less than the third threshold can be rated as level 2, and network accounts occurring equal to or greater than the third threshold can be rated as level 3. The network accounts with a higher lever may have a higher possibility to be corresponding with the mobile communication user. With mobile communication user TMSI1 and accessed URL1 as an example, Table 4 shows the results of counting and rating on the first sets of network accounts with respect to times T1 and T2, respectively.

TABLE 4

| Identifier | URL | Access time | The first set of network accounts | Frequency of occurring | level |
|---|---|---|---|---|---|
| TMSI1 | URL1 | T1 | USER1 | 1 | 0 |
|  |  |  | USER2 | 15 | 2 |
|  |  |  | USER3 | 2 | 0 |
|  |  |  | USER4 | 20 | 3 |
| TMSI1 | URL1 | T2 | USER1 | 0 | 0 |
|  |  |  | USER2 | 10 | 1 |
|  |  |  | USER3 | 1 | 0 |
|  |  |  | USER4 | 20 | 3 |

Next, Table 5 can be obtained from a further counting of the occurring frequency of the levels of network accounts for T1 and T2. Each intersection of Table 5 represents the frequency at which each network account is rated as a certain level during the two access times T1 and T2.

TABLE 5

|  | USER1 | USER2 | USER3 | USER4 |
|---|---|---|---|---|
| 0 | 2 | 0 | 2 | 0 |
| 1 | 0 | 1 | 0 | 0 |
| 2 | 0 | 1 | 0 | 0 |
| 3 | 0 | 0 | 0 | 2 |

Based on the counting result of Table 5, any rule may be further used as needed to determine whether a network account is corresponding to mobile communication user TMSI1. In an exemplary embodiment, the degree of correspondences between network accounts and mobile communication user TMSI1 may be further subdivided. For example, USER4 being rated as level 3 for more than one time may be determined as a "confirmed" network account that corresponds to the mobile communication user. Further, USER2 being rated once as level 1 and once as level 2 may be determined as a "possible" network account that corresponds to the mobile communication user. USER1 and USER 3 each being rated twice as level 0 may be determined as network accounts that do not correspond to the mobile communication user. Therefore, more accurate correspondences can be obtained from the further subdivided results. The second set of network accounts may be formed through selecting network accounts with different degrees of correspondence, such as, for example, "confirmed", "possible", etc. Alternatively, a plurality of second sets of network accounts with different degrees of correspondence may be formed. It is to be understood that the rules for determining degrees of correspondence and for constructing the second set of network accounts may be specified as needed, and are not limited to the examples shown above.

FIG. 4 and FIG. 5 are based on counting the same URL (URL1). However, it should be understood that a single mobile communication user (e.g., TMSI1) may, during his/her access to the same network resource, access multiple URLs associated with the network resource, for example, URL1, URL1', URL1'" . . . corresponding to different pages of the same website. Counting results of these URL1, URL1', URL1" . . . may be merged in Table 3 to Table 5 to determine network accounts associated with the mobile communication user.

In an exemplary embodiment, a communication number of the mobile communication user corresponding to the mobile communication user's identifier may be further obtained and mapped to the second set of network accounts. For example, in a case in which the identifier of the mobile communication user is TMSI of the mobile communication user as shown in Table 1-Table 3, International Mobile Subscriber Identity (IMSI) corresponding to the TMSI may be obtained through CDR as described above, and a communication number (e.g., a mobile phone number) of the mobile communication user corresponding to the IMSI may be obtained through a specific calculation or from a Home Location Register (HLR). Thereby, a corresponding relationship between the second set of network accounts and the communication number of the mobile communication user may be established. Upon establishing such a corresponding relationship, all network accounts corresponding to a communication number of the user may be conveniently shared between different communication numbers of the user himself and other persons, or all network accounts may be retrieved through the communication number if the mobile communication device has been lost.

Figure 6:
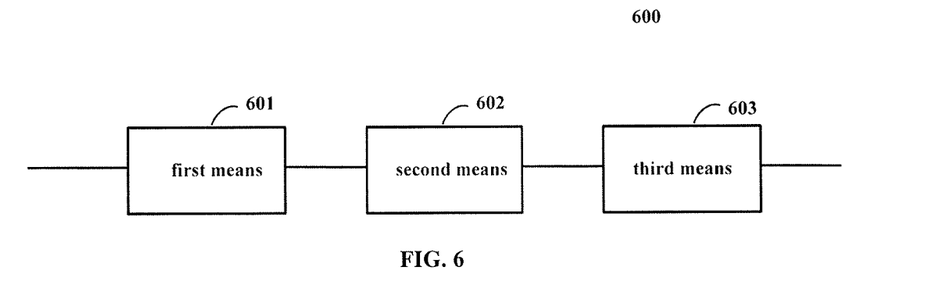
FIG. 6 shows a block diagram of an apparatus for establishing correspondences between mobile communication users and their network accounts according to an exemplary embodiment of the present invention.

FIG. 6 shows an apparatus 600 for establishing correspondences between mobile communication users and their network accounts. The apparatus can include a first means 601 for acquiring an identifier of the mobile communication user and access information corresponding to the identifier from a communication stream, the access information including Uniform Resource Locators (URLs) associated with network resources that have been accessed by the mobile communication user. The apparatus can further include a second means 602 for acquiring a first set of network accounts associated with the URLs, and a third means 603 for determining a second set of network accounts corresponding to the mobile communication user based on the first set of network accounts. It is to be understood that the first means 601, the second means 602, and the third means 603 may correspond to one or more processors, including the processing unit 16 shown in FIG. 1, executing instructions to perform the operations described herein.

In an exemplary embodiment, the URLs can include an original URL directly corresponding to a network resource that has been accessed by the mobile communication user. Acquiring a first set of network accounts can include acquiring associated URLs in association with the original URL, acquiring information of pages corresponding to the original URL and the associated URLs, and acquiring network accounts contained in the information of pages to form the first set of network accounts.

In an exemplary embodiment, determining a second set of network accounts corresponding to the mobile communication user based on the first set of network accounts can include determining the second set of network accounts based on the frequency of each network account occurring in the first set of network accounts.

In an exemplary embodiment, determining the second set of network accounts based on the frequency of each network account occurring in the first set of network accounts can include counting the frequency of each network account occurring in the first set of network accounts, and forming the second set of network accounts using the network accounts with the frequency occurring over a predetermined threshold.

In an exemplary embodiment, the access information further can include access times corresponding to the URLs. Determining the second set of network accounts based on the frequency of each network account occurring in the first set of network accounts can include, for each access time corresponding to a URL, counting the frequency of each network account occurring in the first set of network accounts associated with the URL, and determining a level of each network account based on the counting, further counting the frequency of the levels of each network account occurring, and forming the second set of network accounts corresponding to the mobile communication user based on the further counting.

In an exemplary embodiment, the access information can further include an access time corresponding to the original URL, and the associated URLs can include associated URLs in association with the original URL and having access times closer to the access time of the original URL.

In an exemplary embodiment, the associated URLs can include associated URLs in association with the original URL and corresponding to the same type of network resource as the original URL.

In an exemplary embodiment, the apparatus can further include means for acquiring a communication number of the mobile communication user corresponding to the identifier of the mobile communication user and associating the communication number with the second set of network accounts.

In an exemplary embodiment, the identifier of the mobile communication user can be, for example, a Temporary Mobile Subscriber Identity (TMSI) of the mobile communication user. Acquiring a communication number of the mobile communication user corresponding to the identifier of the mobile communication user can include acquiring an International Mobile Subscriber Identity (IMSI) corresponding to the TMSI, and acquiring a communication number of the mobile communication user corresponding to the IMSI.

Exemplary embodiments of the present invention may be, for example, a system, a method, and/or a computer program product. The computer program product may include a computer readable storage medium having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network such as, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for performing operations of the present invention may be, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In exemplary embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to exemplary embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various exemplary embodiments of the present invention. In this regard, each block in the flowchart or block diagrams may represent a circuit, module, segment, or portion of code, which includes one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various exemplary embodiments of the present invention have been presented for purposes of illustration, and are not intended to be exhaustive or limited to the exemplary embodiments disclosed. Many modifications and variations will be apparent to those of ordinary skill in the art without departing from the scope and spirit of the described exemplary embodiments.

What is claimed is:

1. A method for establishing correspondences between mobile communication users and their network accounts, comprising:
    acquiring an identifier of one of the mobile communication users and access information corresponding to the identifier from a communication stream, wherein the access information comprises Uniform Resource Locators (URLs) associated with network resources that have been accessed by the one of the mobile communication users;
    acquiring a first set of network accounts associated with the URLs, wherein the first set of network accounts comprises user login credentials used to access the network resources associated with the URLs; and
    forming a second set of network accounts corresponding to the one of the mobile communication users by performing a statistical analysis on the first set of network accounts to create a subset of the first set of network accounts,
    wherein the second set of network accounts comprises the subset of the first set of network accounts, and the second set of network accounts is formed based on a frequency of each network accounts occurring in the first set of network accounts;
    wherein the access information further comprises access times corresponding to the URLs,
    wherein forming the second set of network accounts based on the frequency of each network account occurring in the first set of network accounts comprises:
    for each access time corresponding to a URL, counting the frequency of each network account occurring in the first set of network accounts associated with the URL, and determining a level of each network account based on the counting;
    further counting the frequency of the levels of each network account occurring; and
    forming the second set of network accounts corresponding to the one of the mobile communication users based on the further counting.

2. The method according to claim 1, wherein the URLs comprise an original URL directly corresponding to a network resource that has been accessed by the one of the mobile communication users, and acquiring the first set of network accounts comprises:
    acquiring associated URLs in association with the original URL;
    acquiring information in pages corresponding to the original URL and the associated URLs; and
    acquiring network accounts contained in the information in the pages to form the first set of network accounts.

3. The method according to claim 2,
    wherein the access information further comprises an access time corresponding to the original URL, and
    wherein the associated URLs comprise associated URLs in association with the original URL and having access times closer to the access time of the original URL.

4. The method according to claim 2,
    wherein the associated URLs comprise associated URLs in association with the original URL and corresponding to a same type of network resource as the original URL.

5. The method according to claim 1, wherein forming the second set of network accounts based on the frequency of each network account occurring in the first set of network accounts comprises:
    counting the frequency of each network account occurring in the first set of network accounts; and
    forming the second set of network accounts using the network accounts with a counted frequency that is over a predetermined threshold.

6. The method according to claim 1, further comprising:
    acquiring a communication number of the one of the mobile communication users corresponding to the identifier of the one of the mobile communication users and associating the communication number with the second set of network accounts.

7. The method according to claim 6,
    wherein the identifier of the one of the mobile communication users is a Temporary Mobile Subscriber Identity (TMSI) of the one of the mobile communication users, and
    wherein acquiring the communication number of the one of the mobile communication users corresponding to the identifier of the one of the mobile communication users comprises:
    acquiring an International Mobile Subscriber Identity (IMSI) corresponding to the TMSI; and
    acquiring a communication number of the one of the mobile communication users corresponding to the IMSI.

8. An apparatus for establishing correspondences between mobile communication users and their network accounts, comprising:
    a memory storing a computer program; and
    a processor configured to execute the computer program, wherein the computer program is configured to:
    acquire an identifier of one of the mobile communication users and access information corresponding to the identifier from a communication stream, wherein the access information comprises Uniform Resource Locators (URLs) associated with network resources that have been accessed by the one of the mobile communication users;

acquire a first set of network accounts associated with the URLs, wherein the first set of network accounts comprises user login credentials used to access the network resources associated with the URLs; and form a second set of network accounts corresponding to the one of the mobile communication users by performing a statistical analysis on the first set of network accounts to create a subset of the first set of network accounts, wherein the second set of network accounts comprises the subset of the first set of network accounts, and the second set of network accounts is formed based on a frequency of each network account occurring in the first set of network accounts;

wherein the access information further comprises access times corresponding to the URLs, wherein forming the second set of network accounts based on the frequency of each network account occurring in the first set of network accounts comprises:

for each access time corresponding to a URL, counting the frequency of each network accounting occurring in the first set of network accounts associated with the URL, and determining a level of each network account based on the counting;

further counting the frequency of the levels of each network account occurring; and forming the second set of network accounts corresponding to the one of the mobile communication users based on the further counting.

9. The apparatus according to claim 8, wherein the URLs comprise an original URL directly corresponding to a network resource that has been accessed by the one of the mobile communication users, and acquiring the first set of network accounts comprises:

acquiring associated URLs in association with the original URL;

acquiring information in pages corresponding to the original URL and the associated URLs; and acquiring network accounts contained in the information in the pages to form the first set of network accounts.

10. The apparatus according to claim 9, wherein the access information further comprises an access time corresponding to the original URL, and wherein the associated URLs comprise associated URLs in association with the original URL and having access times closer to the access time of the original URL.

11. The apparatus according to claim 9, wherein the associated URLs comprise associated URLs in association with the original URL and corresponding to a same type of network resource as the original URL.

12. The apparatus according to claim 8, wherein forming the second set of network accounts based on the frequency of each network account occurring in the first set of network accounts comprises:

counting the frequency of each network account occurring in the first set of network accounts; and forming the second set of network accounts using the network accounts with a counted frequency that is over a predetermined threshold.

13. The apparatus according to claim 8, wherein the computer program is further configured to:

acquire a communication number of the one of the mobile communication users corresponding to the identifier of the one of the mobile communication users and associating the communication number with the second set of network accounts.

14. The apparatus according to claim 13, wherein the identifier of the one of the mobile communication users is a Temporary Mobile Subscriber Identity (TMSI) of the one of the mobile communication users, and wherein acquiring the communication number of the one of the mobile communication users corresponding to the identifier of the one of the mobile communication users comprises:

acquiring an International Mobile Subscriber Identity (IMSI) corresponding to the TMSI; and acquiring a communication number of the one of the mobile communication users corresponding to the IMSI.

* * * * *